United States Patent [19]

Ross et al.

[11] 4,024,822

[45] May 24, 1977

[54] PNEUMATIC SEEDER ASSEMBLY

[76] Inventors: Arthur Ross, Box 4; Lawrence Preston Davey, Box 32, both of Antler, Canada

[22] Filed: Dec. 22, 1975

[21] Appl. No.: 643,076

[52] U.S. Cl. .................................. 111/34; 111/62; 111/66; 222/193; 239/553.5; 239/565; 239/590.5; 239/655; 302/28; 302/59

[51] Int. Cl.² .................. A01C 7/00; A01C 15/04; B65G 53/04

[58] Field of Search .................. 111/14, 10, 34, 11, 111/73, 77; 222/193, 194, 178, 330, 478, 564; 302/28, 59, 61, 63; 239/654, 655, 590, 590.5, 548, 553, 553.5; 221/211

[56] References Cited

UNITED STATES PATENTS

| 1,641,275 | 9/1927 | Hughes | 302/28 UX |
|---|---|---|---|
| 3,204,942 | 9/1965 | Matthys et al. | 302/28 X |
| 3,265,442 | 8/1966 | Willis, Jr. et al. | 302/28 |
| 3,515,315 | 6/1970 | Kidd | 222/193 |
| 3,548,765 | 12/1970 | Grataloup | 111/77 X |
| 3,631,825 | 1/1972 | Weiste | 222/330 X |
| 3,885,704 | 5/1975 | Linemann | 221/211 |

FOREIGN PATENTS OR APPLICATIONS

| 2,025,039 | 5/1970 | Germany | 111/34 |
|---|---|---|---|
| 158,560 | 8/1954 | United Kingdom | 222/564 |
| 1,097,351 | 1/1968 | United Kingdom | 111/77 |

Primary Examiner—Edgar S. Burr
Assistant Examiner—Steven A. Bratlie
Attorney, Agent, or Firm—Stanley G. Ade

[57] ABSTRACT

Seed and/or fertilizer or similar particulate material is fed by a seed cup assembly or the like from a hopper to a main conduit through which air is passing at a rate sufficient to ensure that the material is picked up by the air stream and transported thereby. A main distributor head receives the material and feeds it pneumatically to a plurality of secondary distributor heads. A plurality of feed conduits extends from each secondary distributing head one to each of the seed outlets provided adjacent the furrow openers of the assembly. Each distributor head is provided with tapered restrictors which concentrate the material centrally so that it strikes the curved upper end centrally and is thus spread evenly to all of the conduits extending from the manifold thus ensuring even distribution of the material.

6 Claims, 4 Drawing Figures

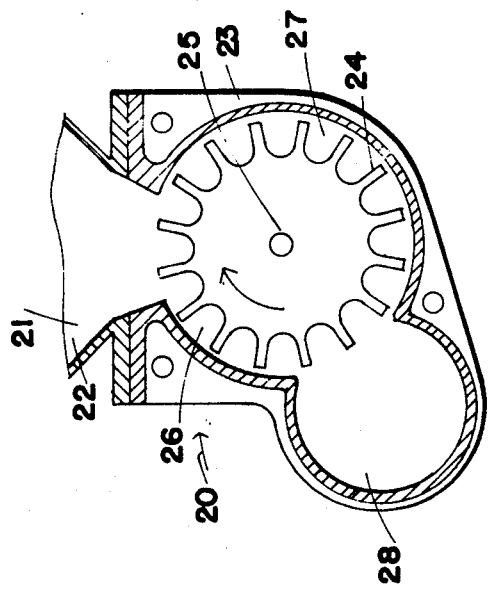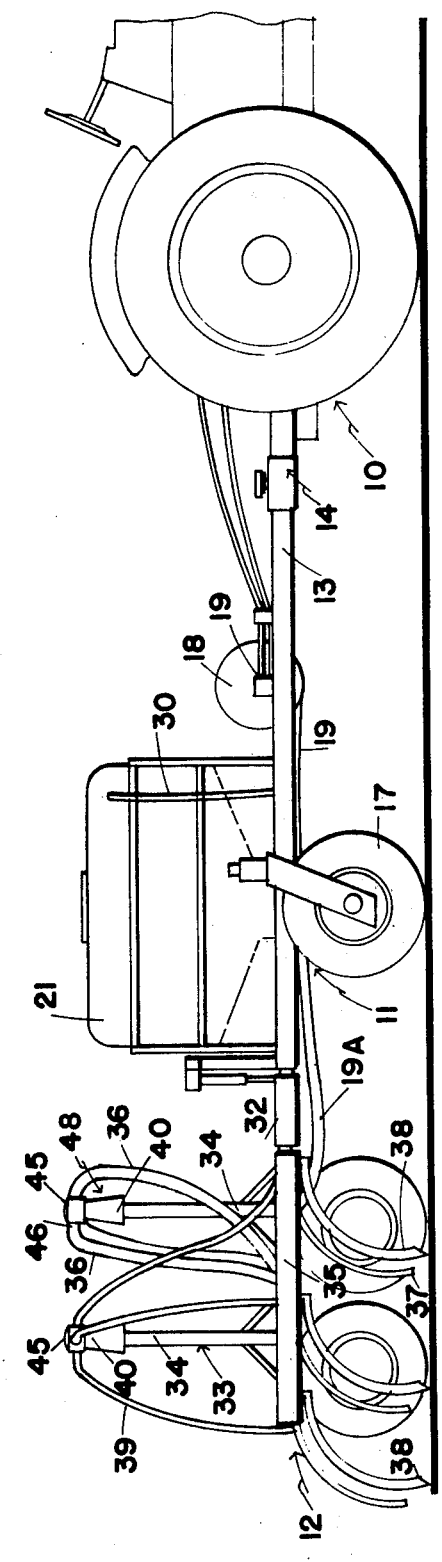

1

PNEUMATIC SEEDER ASSEMBLY

BACKGROUND OF THE INVENTION

This invention relates to new and useful improvements in the conveying of particulate material such as seed grain, granular fertilizer and the like, from a hopper to conventional furrow openers.

Various attempts have been made to pneumatically deliver particulate material such as seed or fertilizer from a main hopper to the furrow openers of a conventional seed drill but great difficulty is experienced in ensuring substantially even distribution of the material to each of the seed drills.

Other disadvantages include the provision of the seed hopper on the seed drill and as this varies in weight considerably from relatively full to relatively empty difficulty has been experienced in maintaining a even depth of penetration of the furrow openers. When used with seed grain for example, the depth at which the seed is placed below the surface of the ground is of particular importance to the growth of the seed.

SUMMARY OF THE INVENTION

The present invention overcomes these disadvantages firstly by providing a wheeled component upon which the hoppers may be placed. This ensures that there is no variation of weight upon the seed drill assembly connected therebehind.

Secondly, distributor heads are utilized which include means to direct the seed axially through the distributing heads so that it strikes a domed upper side centrally of the dome. This means that the seed will spread evenly from the center of the dome thus entering radially extending exits formed around the perimetrical wall of the dome. This ensures a much better distribution of the material to each of the exit conduits.

The principle object and essence of the invention is therefore to provide a device of the character herewithin described which enables the pneumatic placement of a particulate material, to be accomplished readily and easily and at the same time ensures that a relatively even distribution of the material is provided.

Another object of the invention is to provide a device of the character herewithin described which includes means in the distributor heads to direct the material towards the vertical axis as it is passed upwardly through the distributing heads.

Still another object of the invention is to provide a device of the character herewithin described in which the weight of the particulate material is carried by a separate component rather than being placed upon the seed drill assembly thereby facilitating the maintenance of an even depth of penetration of the furrow openers of the drill assembly.

Still another object of the invention is to provide a device of the character herewithin described which includes a hopper carrying component upon which one or more hoppers may be supported with the seed drill assembly being towed therebehind so that the seed drill may be attached thereto by means of draft arms to keep the tillage implement or seed drill level on rolling land.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, our invention consists essentially in the arrangement and construction of parts all as hereinafter more particularly described, reference being had to the accompanying drawings in which:

DESCRIPTION OF THE DRAWINGS

FIG. 1 is a partially schematic side elevation of the device.

FIG. 4 is an enlarged cross sectional view of one embodiment of the feeding mechanism from the hopper to the pneumatic conveyor tube. of In the drawings like characters of reference indicate corresponding parts in the different figures.

DETAILED DESCRIPTION

Figure 2:
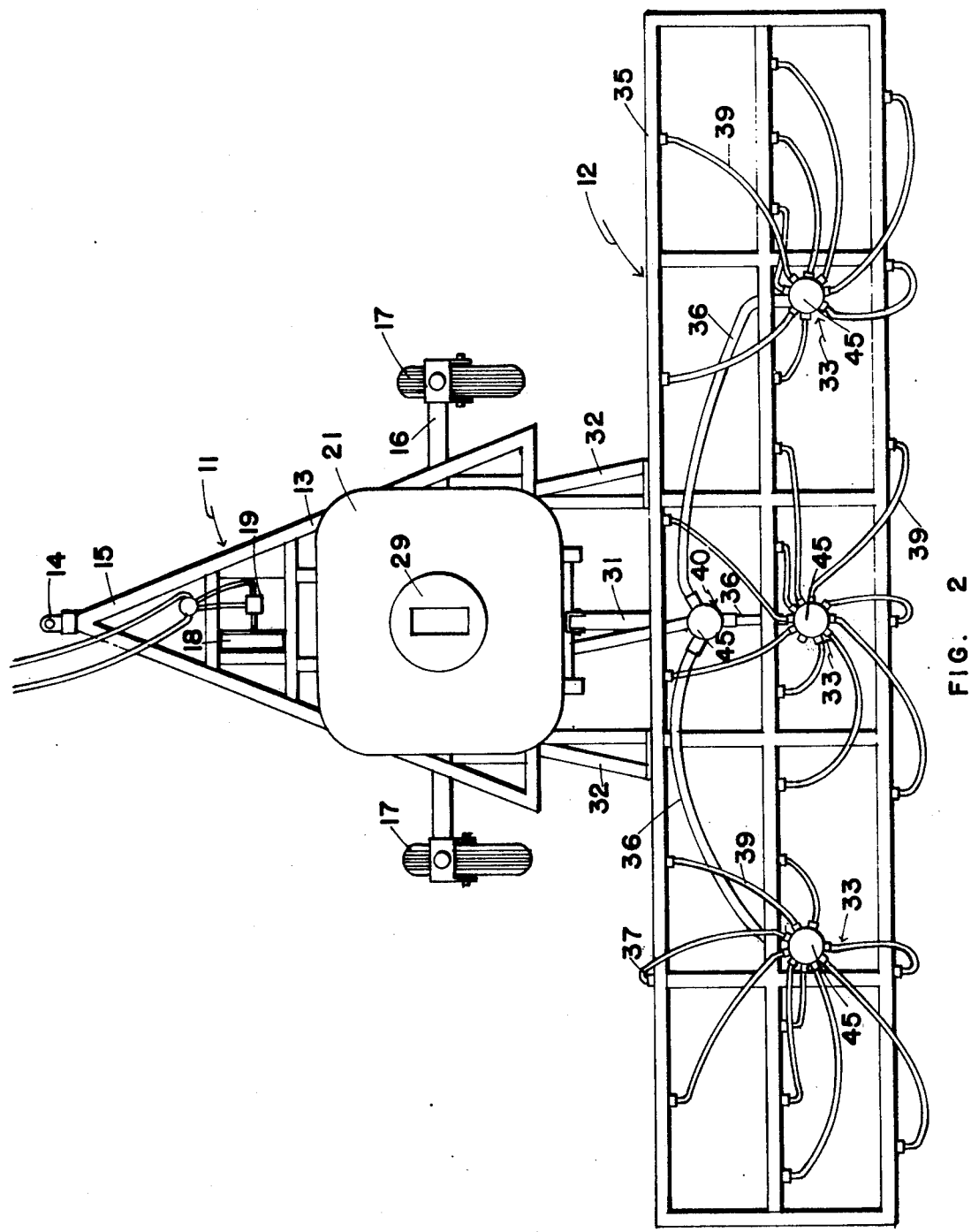
FIG. 2 is a top plan view of FIG. 1.

In the accompanying specification and drawings, the term "seed drill" is used but it should be understood that this includes any tillage equipment which can be used for the deposition upon the ground or in the ground of any particulate material including seed grains, granular fertilizer and the like.

Proceeding therefore to describe the invention in detail, reference to FIG. 1 will illustrate a source of power such as a tractor 10 behind which is situated a hopper carrying component collectively designated 11. Situated behind the component 11 is a piece of tillage equipment which, in this embodiment, represents a seed drill collectively designated 12.

Dealing first with the hopper carrying component 11, a substantially triangular frame 13 is provided having a conventional hitch 14 situated upon the front apex 15 of the frame and the component is detachably connected to the rear of the tractor as clearly shown in FIG. 1.

A transverse axle 16 extends across the frame 13 towards the rear end thereof and ground engaging castor wheel assemblies 17 are supported by the axle and support the component in a conventional manner.

In this embodiment, a centrifugal blower assembly is shown schematically by reference character 18 and is mounted within the frame 13. This may be driven by an hydraulic motor 19 or by any other suitable means deriving its power from the tractor 10.

The centrifugal blower 18 produces the necessary volume of air at the appropriate pressure for the purposes hereinafter to be described and the volume and pressure of course depends upon the design parameters of the assembly.

A main air conduit 19 extends from the outlet of the blower 18 to a feeding device collectively designated 20 and then continues as conduit 19A to a main distributor head collectively designated 48.

A material holding hopper 21 is mounted within the chassis or frame 13 of the component 11 and is provided with a funnel type base 22 which is conventional in construction.

The sealed feeding device 20 takes the form of a star feeder in this particular embodiment but of course it will be appreciated that other feeding means may be provided such as an auger or worm type feeder.

A casing 23 includes a rotatable star wheel 24 journalled upon an axle 25 and this may be rotated by any convenient means. However it is preferable that it be operated by one of the ground engaging castor wheel assemblies 17 so that the speed of rotation of the star feeder wheel corresponds to the speed of the device and varies therewith.

The star feeder assembly is conventional and includes the sealed side 26 and the clearance side 27 in order to prevent the grain from being crushed as it is fed from the base of the hopper to a main cylindrical outlet 28 formed on one side of the casing 23 and communicating with the star wheel 24. The main conduit 19 connects to one side of outlet 28 and conduit 19A to the other so that air under pressure is passing through this outlet 28 thereby picking up material fed to this outlet by the star wheel 24.

The hopper 22 is sealed at the upper side thereof by means of cover 29 and a relatively small diameter conduit or tube 30 extends from the main conduit 19 to the interior of the upper side of the hopper 22 above material contained therein thus acting as a compensator and equalizing pressure within the hopper and within the main conduit 19. This, together with the sealed hopper, prevents blow back from occurring past the star wheel 24.

The tillage machine or assembly 12 is pulled behind the component 11 and is connected by a main drawbar 31 and a pair of draft arms 32 which are pivotally connected so that the tillage implement or assembly can remain level on rolling ground and are not elevated by the component 11. This of course is important particularly if seed is being planted so that the depth of planting is maintained.

The aforementioned main distributor head 48 is mounted upon the seeder 12 and a plurality of secondary distributor heads 33 are also mounted on the seeder rearwardly of the main distributor head 48. The construction of the distributor heads 48 and 33 is similar and the description thereof refers to both.

A substantially vertical tube 34 is secured to the frame 35 of the seeder 12 and extends upwardly therefrom as clearly illustrated. Insofar as the main distributor head 48 is concerned, conduit 19A connects to the lower end of the vertical tube 34.

Flexible conduits 36 extend from the upper end of the main distributor head 48 as will hereinafter be described, each one connecting to the lower end of the relevant standard or tube 33 of the secondary distributor heads. In the present embodiment three such secondary distributor heads are shown so that three flexible conduits 36 extend from the upper end of the main distributor head 48.

Each secondary distributor head is connected to a group of seed or fertilizer outlets 37 each one of which is situated adjacent a furrow opener 38 and flexible conduits 39 extend between the upper end of the secondary distributor heads 33 to the seed outlets 37. A schematic view of the these conduits is shown in FIG. 2.

Figure 3:
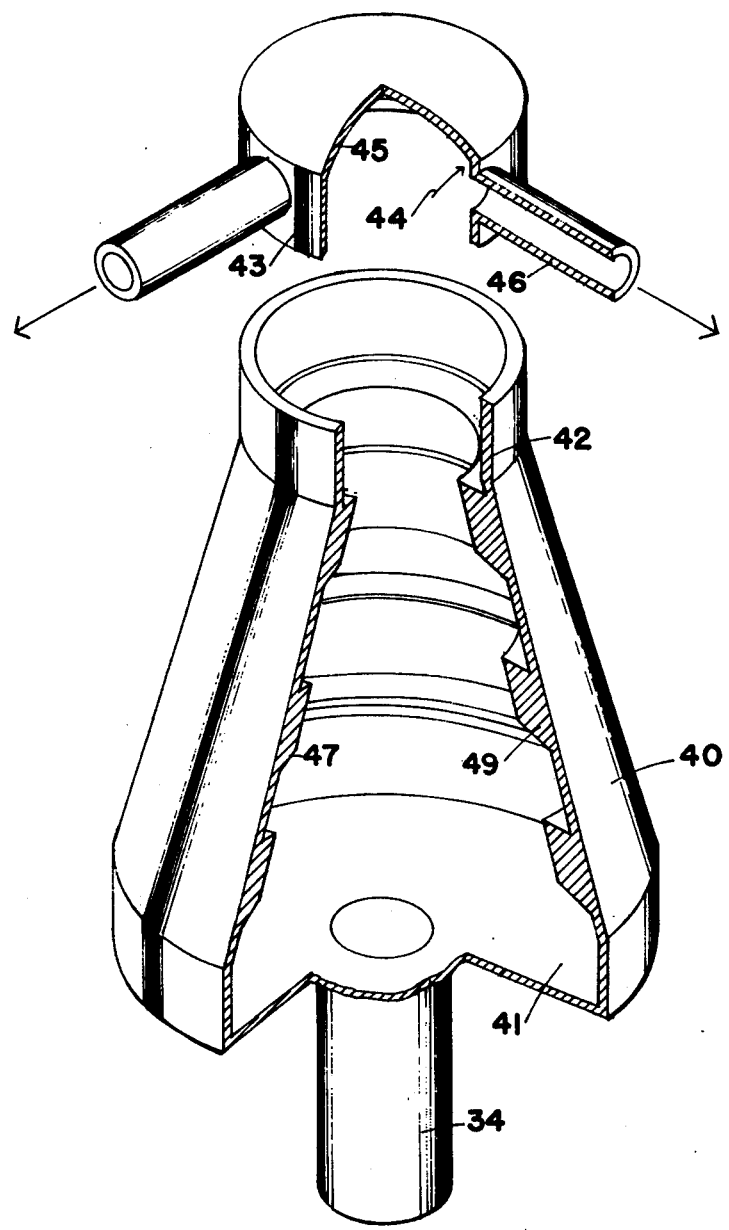
FIG. 3 is an enlarged isometric partially sectioned view of one of the distributor heads.

The construction of the main and secondary distributor heads is shown in detail in FIG 3.

They are preferably made of plastic and include a truncated cone body portion indicated by reference character 40 and having the wide end lowermost. The distributor heads are situated vertically when in use.

A planar base 41 spans the lower wider end of the main body portion 40 and the intake conduits 19A or 36 enter these bases 41 centrally as clearly illustrated.

A collar or band 42 is formed on the upper narrower end of the main body portion 40 to receive an annular wall 43 of the domed upper end collectively designated 44 which may engage over this narrow band 42 and may be connected thereto by a conventional means such as adhesive or other fastening devices.

This domed upper end includes the aforementioned annular wall 43 and a domed upper panel end 45.

A plurality of conduit attachment tubes 46 extend radially around the annular wall 43 and the aforementioned flexible conduits 36 or 39 may be connected to these in the usual way.

Means are provided to direct the entrained material to the center of the domed portion 45 in order to ensure substantially equal distribution through the outlets 46, said means taking the form of a plurality of tapered rings 49 formed around the interior of the sloping wall of the main body portion 40. These annular rings incline inwardly as indicated by reference character 47 so that the thickness of the rings increases from the lower side thereof towards the upper side. This directs material passing through the main body portion, towards the vertical axis of the main body portion and centers it as it strikes the domed surface 45.

As mentioned previously, the air from the blower is of sufficient volume and pressure to entrain the material delivered from the hopper by means of the star wheel 24 and to convey it pneumatically firstly from the outlet 28 of the hopper to the main distributor head 48, secondly from the main distributor head 48 to the secondary distributor heads 33 and thirdly from the secondary distributor heads to the seed outlets 37 thus ensuring relatively equal distribution of the material to all of the seed outlets. The volume and pressure of the air should also be sufficient to eject the material with enough force to ensure that the material, particularly if this material is seed, is spread out into the furrow formed by the furrow openers 38.

Finally reference should be made to the compensator tube 30 which not only prevents blow back but facilitates the accurate delivery of the required amount of material from the hopper to the main conduit 19A.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. In a pneumatic assembly for the deposition within the ground of particulate material such as seed grain, granular fertilizer and the like and operable by a source of power such as a tractor, said assembly including a material hopper carrying component detachably securable to the source of power, ground engaging wheels supporting said component, a seed drill assembly detachably connected to said hopper carrying component and ground engaging wheels supporting said seed drill assembly; the improvement comprising in combination a particulate material holding hopper on said component having an outlet therein, a main distributing head on said pneumatic assembly, means for pneumatically conveying material from said hopper to said main distributor head, at least one secondary distributor head on said pneumatic assembly, means for pneumatically conveying the material from said main distributor head to said secondary distributor head, a plurality of furrow opening means on the seed drill assembly for the deposition of said material within the ground, means for pneumatically conveying material from said secondary distributor head to adjacent each of said furrow opening means, said distributor heads including a concavely domed upper side, said material entering said distributor heads from the base thereof and means in said distributor heads to direct the material towards the center of said domed upper side, said distributor heads comprising a main body portion having a substantially truncated cone shaped configuration situated substantially vertically when in use, said domed upper side being situated on the narrower upper end of said main body portion, a base spanning the wider lower end of said main body portion, said means for pneumatically conveying material being connected centrally to said base, said means in said distributor heads for centering the material passing therethrough including at least one annular tapered ring formed within said main body portion, the cross section of said ring increasing in thickness from the lower side towards the upper side thus acting to funnel material towards the vertical axis of said main body portion and outlet means radially extending around the perimetrical wall of said domed upper side.

2. The improvement according to claim 1 which includes pressure compensating means extending between said means for pneumatically conveying material and the interior of said hopper above the material contained therein, said hopper being sealed when in operation.

3. A pneumatic assembly for the deposition within the ground of particulate material such as seed grain, granular fertilizer and the like and operable by a source of power such as a tractor; said assembly comprising in combination a material hopper carrying component detachably securable to said source of power, ground engaging wheels supporting said component, a seed drill assembly detachably connected to said hopper carrying component and ground engaging wheels supporting said seed drill assembly, means detachably connecting said seed drill assembly to said hopper carrying component, a particulate material holding hopper on said component having an outlet therein, a main distributing head on said pneumatic assembly, means for pneumatically conveying material from said hopper to said main distributing head, at least one secondary distributor head on said pneumatic assembly, means for pneumatically conveying material from said main distributor head to said secondary distributor head, a plurality of furrow opening means on said seed drill assembly for the deposition of said material within the ground, means for pneumatically conveying the material from said secondary distributing head to adjacent each of said furrow opening means, said distributor heads including a concavely domed upper side, said material entering said distributor heads from the base thereof and means in said distributor heads to direct the material towards the center of said domed upper side, said distributor heads comprising a main body portion having a substantially truncated cone shaped configuration situated substantially vertically when in use, said domed upper side being situated on the narrower upper end of said main body portion, a base spanning the wider lower end of said main body portion, said means for pneumatically conveying material being connected centrally to said base, said means in said distributor heads for centering the material passing therethrough including at least one annular tapered ring formed within said main body portion, the cross section of said ring increasing in thickness from the lower side towards the upper side thus acting to funnel material towards the vertical axis of said main body portion and hence towards the center of said domed upper side and outlet means radially extending around the perimetrical wall of said domed upper side.

4. The assembly according to claim 3 which includes pressure compensating means extending between said means for pneumatically conveying material and the interior of said hopper above the material contained therein, said hopper being sealed when in operation.

5. The device according to claim 3 in which said ground engaging wheels of said component comprise castor wheel assemblies, said means detachably comprising said seed drill assembly to said component comprising at least a pair of draft arms one upon each side thereof and pivotally secured to said component and to said seed drill.

6. A distributor head for use with a pneumatic material conveying system for particulate material such as seed grain, granular fertilizer and the like; comprising in combination a substantially vertically situated, truncated cone shaped main body portion, a base spanning the lower wide end of said body portion and a concavely domed shaped upper side at the upper narrower end of said body portion, material inlet means substantially centrally of said base, a plurality of material outlet means extending radially around the perimetrical wall of said dome shaped upper end and means therein to direct material entering at said base towards the central axis of said main body portion and towards the center of said dome shaped upper end to ensure substantially equal distribution of said material into said outlet means, said last mentioned means including at least one annular tapered ring formed within said main body portion, the cross section of said ring increasing in thickness from the lower side thereof towards the upper side thus acting to funnel material towards the vertical axis of said main body portion.

* * * * *